(12) United States Patent
De Greef et al.

(10) Patent No.: US 6,272,769 B1
(45) Date of Patent: Aug. 14, 2001

(54) APPARATUS AND METHOD FOR CONVEYING OF FRUITS OVER A ROLLERBED

(75) Inventors: Dirk Jan De Greef, Buumalsen; Hendrik Dirk Van De Kop, Kapel-Avezaath; Jan Marinus Van Arkel, Tricht, all of (NL)

(73) Assignee: De Greef s. Wagen-, Carrosserie - en Machinebouw B.V. (NL)

( * ) Notice: Subject to any disclaimer, the term of this patent is extended or adjusted under 35 U.S.C. 154(b) by 0 days.

(21) Appl. No.: 09/341,776

(22) PCT Filed: Jan. 16, 1998

(86) PCT No.: PCT/NL98/00026

§ 371 Date: Dec. 23, 1999

§ 102(e) Date: Dec. 23, 1999

(87) PCT Pub. No.: WO98/31612

PCT Pub. Date: Jul. 23, 1998

(30) Foreign Application Priority Data

Jan. 17, 1997 (NL) .................................................. 1005036

(51) Int. Cl.[7] ....................................................... F26B 3/00
(52) U.S. Cl. .................................. 34/336; 34/399; 34/70; 34/71; 34/236; 34/240
(58) Field of Search ............................. 34/335, 336, 332, 34/355, 399, 69, 70, 71, 398, 68, 236, 239, 240; 198/456, 457.01, 620, 624; 414/433

(56) References Cited

U.S. PATENT DOCUMENTS

| Re. 31,023 | * | 9/1982 | Hall, III | 198/570 |
| 2,070,043 | | 2/1937 | Cutler | 198/127 |
| 3,589,028 | * | 6/1971 | Hinton | 34/85 |
| 3,651,922 | * | 3/1972 | Ross et al. | 198/127 |
| 4,291,472 | * | 9/1981 | Lewis | 34/31 |
| 4,352,249 | * | 10/1982 | Rose | 34/212 |
| 4,698,867 | * | 10/1987 | Kuhl | 15/3.13 |
| 4,698,868 | * | 10/1987 | Kuhl | 15/3.13 |
| 4,985,956 | * | 1/1991 | van der Schoot | 15/3.13 |
| 5,832,627 | * | 11/1998 | Hiebert | 34/580 |

\* cited by examiner

Primary Examiner—Pamela Wilson
(74) Attorney, Agent, or Firm—Needle & Rosenberg, P.C.

(57) ABSTRACT

A device for transporting fragile articles, for example fruit and the like, along a longitudinal path of travel is disclosed. The device includes a spaced and parallel series of rotatable rollers extending along the path of travel for carrying the articles thereon, the rollers forming a series of intermediate article receiving spaces therebetween. A drive assembly is provided for rotating the rollers in the direction of the path of travel, and a carrier assembly is positioned with respect to and spaced from the rollers. A carrier assembly includes a spaced series of carrier members constructed and arranged to engage a peripheral surface portion of the rollers, the carrier assembly being constructed and arranged to move the carrier members in the direction of the path of travel as they engage the peripheral surface portions of the rollers for urging the articles along the path of travel.

19 Claims, 3 Drawing Sheets

APPARATUS AND METHOD FOR CONVEYING OF FRUITS OVER A ROLLERBED

FIELD OF THE INVENTION

Beds of rotatably driven sponge rollers for transporting and simultaneously drying fruit are supplied by applicant in current operations. The fruits are herein transported from an intermediate space between two sponge rollers to a following intermediate space, on the one hand by the rotating movement of the sponge rollers and on the other because the fruits, as it were, push each other forward. However, the fruits herein make mutual contact which, particularly in the case of soft fruits such as particular types of apples, pears and the like, can cause damage and/or bruises, and therefore loss of quality.

BACKGROUND OF THE INVENTION

In order to avoid this it has already been proposed, in addition to the rotatable driving of the sponge rollers, to also displace the rollers during transport in the plane in which the rotating shaft of the sponge rollers are situated. This results however in a complicated and expensive construction, while it is difficult to make provision for wringing out of the sponge rollers. At the location where the direction of movement of the rollers reverses the fruits on the moving rollers will further undergo a falling movement, which is likewise undesirable from the point of view of the quality of the fruit.

Further known from the American patent specification U.S. Pat. No. 2,070,043 is a device wherein carriers are each rotated separately on their own axis. The construction shown herein is complicated, while the outer ends of the carriers describe a relatively large arc at relatively high speed, whereby the fruits can be damaged at the moment they come into contact with the carriers, while due to the large diameter of the described circle it is likewise not very well possible for the fruits to be moved forward from one intermediate space to a subsequent intermediate space. Because of the large circle the carriers either cannot move small fruit forward or they will strike against a large fruit situated in a subsequent or preceding intermediate space, or push a large fruit against a preceding fruit, with the recurring problem of loss of quality.

In the Japanese patent specification 58146265 fruits are transported between drivable brush rollers arranged one above another, wherein the fruits or vegetables are also scraped.

SUMMARY OF THE INVENTION

The present invention provides a device for transporting relatively vulnerable products such as fruits.

The device includes a number of roller elements disposed rotatably and at a fixed position with respect to one another, wherein successive intermediate article receiving spaces are formed between successive roller elements, and a drive for rotatably driving the roller elements. The device also includes a carrier assembly for displacing a product from one intermediate article receiving space to a subsequent intermediate article receiving space. The carrier assembly includes a plurality of carrier members movable into and out of the intermediate article receiving spaces in order to engage the product from behind and beneath thereof. The invention further provides a method for transporting relatively vulnerable or delicate products, which includes the steps of placing the products onto rotatably driven roller elements of at least liquid-absorbing material, rotatably driving the roller elements, and moving a carrier assembly into and out of the intermediate article receiving spaces between successive roller elements for moving the product over the roller elements.

The device and method according to the present invention avoids fruits on the bed of sponge-like rollers making mutual contact, while it is possible to suffice for transport of the fruits with a construction which is not very complicated and which can also be added to existing constructions. The carrier members thus engage tangentially on the fruits in order to prevent damage.

The device is preferably used with rollers which can absorb moisture, such as sponge rollers and (to a leseer degree) also brush rollers. In the preferred embodiment of sponge rollers, the device is preferably also provided with wringing members for wringing out the rotatably driven roller elements.

In order to prevent damage to the fruit, the carrier members are preferably formed by one or more members of soft and/or limp material which will prevent bruises in the case of contact with the fruit.

In a first embodiment the carrier members comprise brush bristles and in a second preferred embodiment a flexible plate of plastic, for instance a plate provided with fingers on the underside thereof.

In a further preferred embodiment the carrier members are formed by carrier members which are arranged on an endless conveyor, while in further preferred embodiments the carrier members are formed by carrier members which are arranged on a reciprocally movable or rotating frame part.

BRIEF DESCRIPTION OF THE DRAWINGS

Further advantages, features and details of the present invention will be elucidated on the basis of the following description of a preferred embodiment thereof with reference to the annexed drawing, in which.

DETAILED DESCRIPTION

Figure 1:
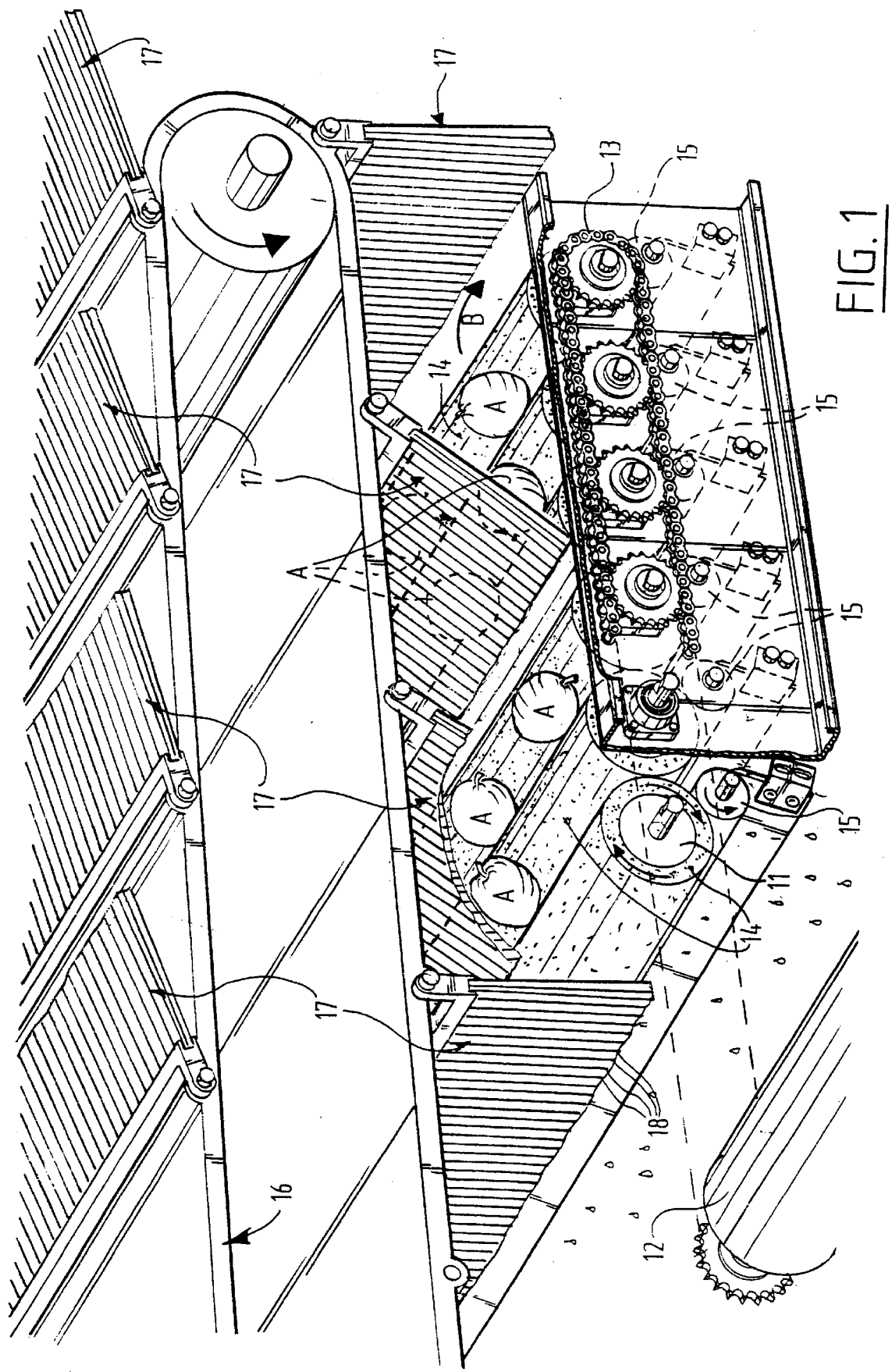
FIG. 1 shows a partly exploded perspective view of a first preferred embodiment of a device according to the present invention.

A first preferred embodiment of a device 10 (FIG. 1) comprises a number of rollers 11 disposed mutually adjacently and in fixed position which are drivable for transport of fruits A in the direction of arrow B using a drive motor 12 and a chain 13. Rollers 11 are provided at least along the outer periphery with a layer of sponge-like material 14, since the fruits are usually placed in wet condition onto the bed formed by rollers 11 prior to being fed to a further device for sorting to size, weight and/or quality. A rotatably mounted wringing roller 15 is arranged in each case under each roller 11 in order to wring out the covering layer 14. For displacement of fruits A from the intermediate space between the rotatably driven rollers 11, which in themselves already provide some transporting action, a conveyor belt 16 is provided. The conveyor belt is equipped with a plurality of spaced, rotatable brushes 17 with elongate bristles 18 which are slightly flexible and which are dragged over the rollers 11 into the intermediate space therebetween by the conveyor 16 driven in a manner which is not shown. The conveyor 16 prevents fruits A from coming into mutual contact, thereby avoiding bruises, which is particularly important in the case of soft apples, pears, peaches and the like.

Figure 2B:
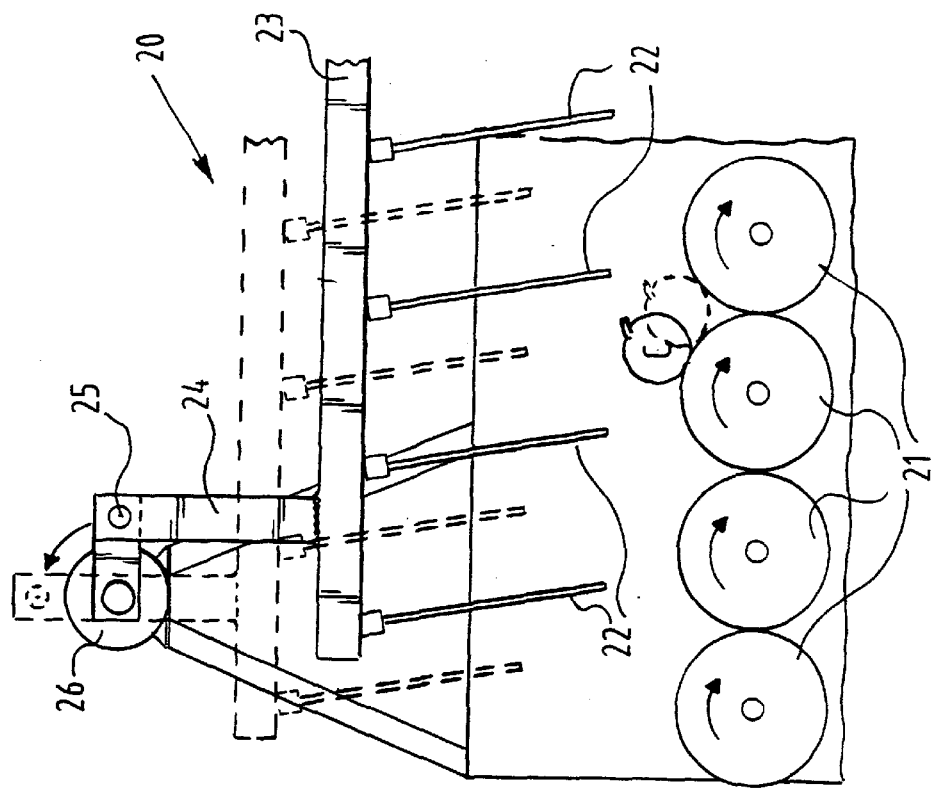
FIG. 2A and FIG. 2B respectively, show schematic side views of a second preferred embodiment of a device according to the present invention in two respective operating positions.
Figure 2A:
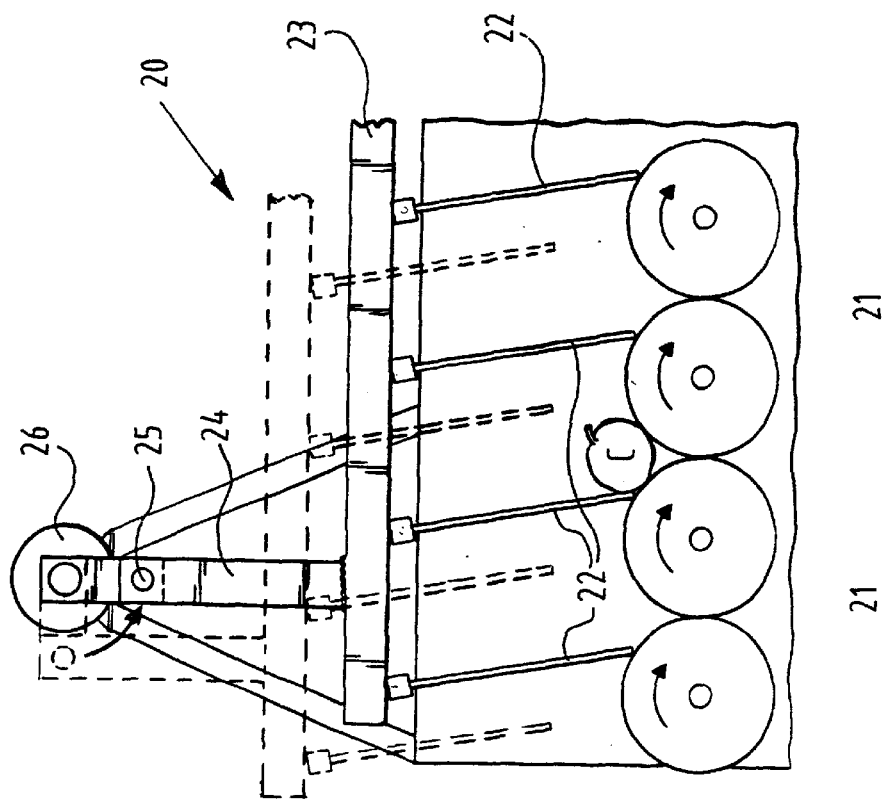

In the embodiment according to FIGS. 2A and 2B a device 20 according to the present invention is provided with sponge rollers 21 and carrier members 22 in the form of brushes such as in FIG. 1, or in the form of at least slightly flexible plates or slabs of plastic for at least slightly lifting and transporting one fruit C at a time from an intermediate space between rollers 21. For this purpose the carriers 22 are arranged on a frame part 23 which via an arm 24 and via a pivot point 25 is rotated eccentrically on a shaft from motor 26 relative to the fixed frame (not further shown). Carriers 22 are moved successively from the position indicated with broken lines in FIG. 2A to the position indicated with full lines in FIG. 2A, the position indicated with full lines in FIG. 2B into the position indicated with broken lines in FIG. 2B, wherein the carrier members 22 once again transport the fruit over a pitch distance of roller 21. As soon as the fruits are situated on the top of the roller, further transport is effected by the driven sponge rollers 21.

Because the outer ends of carrier members 22 describe a relatively small circle, these carriers can easily be moved up and downward in the intermediate space between rollers 21, whereby a fruit is pushed tangentially and lifted out of the intermediate space, irrespective of the size of the fruit and without the danger of a preceding or following fruit also being contacted or the fruits being pushed against each other.

Figure 3B:
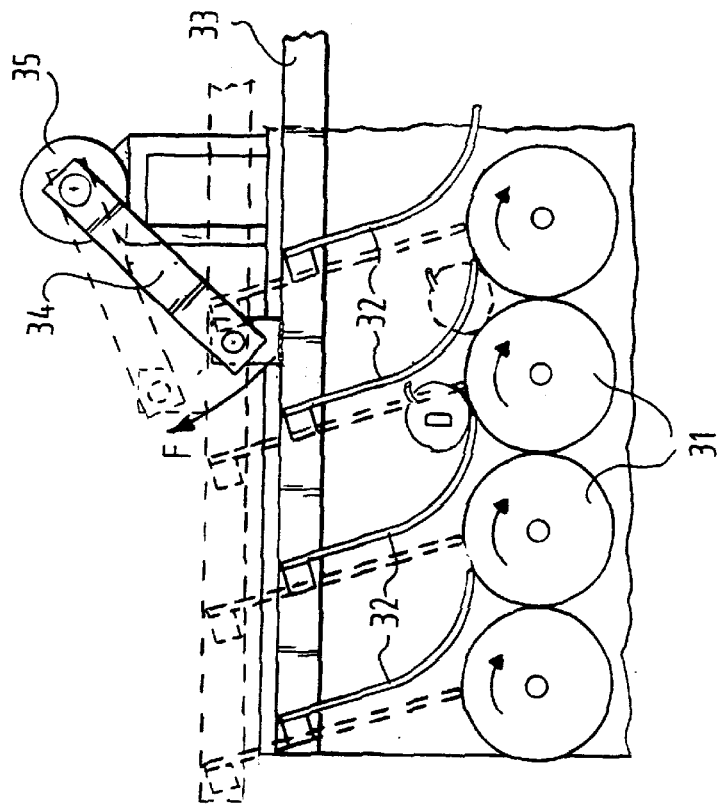
FIGS. 3A and 3B respectively show schematic side views of a third preferred embodiment of a device according to the present invention.
Figure 3A:
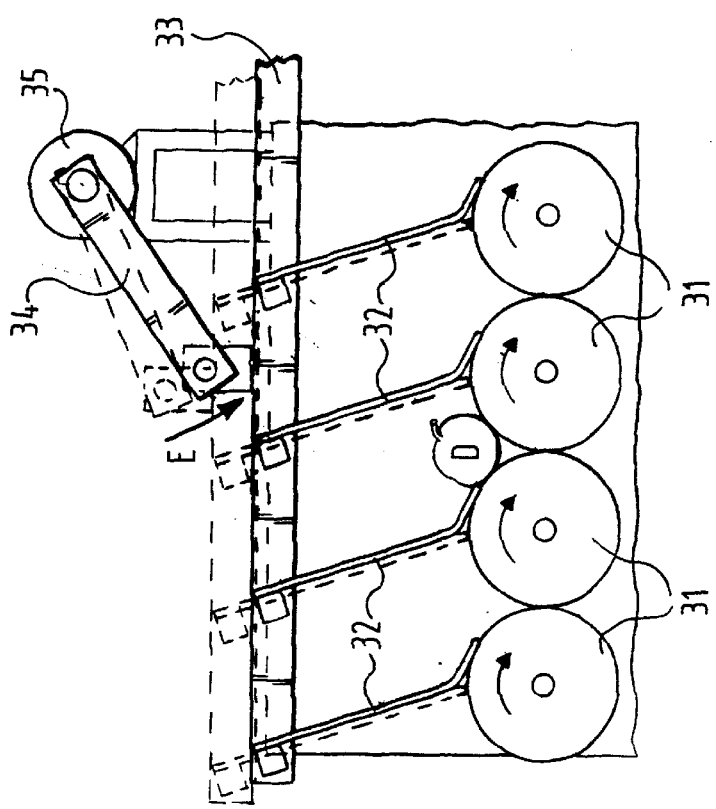

In the embodiment shown in FIGS. 3A and 3B, wherein fruits D must be transported over sponge rollers 31, carrier members 32 are arranged on a frame part 33, which frame part 33 is driven reciprocally, i.e. in the direction of the arrows E and F, via an up and downward movable arm 34 using a motor 35.

From the position drawn in FIG. 3A with broken lines the frame part 33 is moved downward in the direction of arrow E by the driver of motor 35 until a carrier member 32 is placed behind the fruit D, whereafter this fruit is lifted slightly by the relevant carrier into the position shown in FIG. 3B, whereafter further transport of thin fruit takes place using the drive of sponge roller 31. From the position drawn in FIG. 3B in full lines, the frame part 33 is moved upward in the direction of arrow F to above the level of the top part of the fruits D by means of moving arm 34, whereafter the carriers are moved downward once again to the position shown in FIG. 3A. Since carrier members 32 are slightly flexible, they could be allowed to make slight contact with fruits D in the returning position, the more so since this return movement is opposed to the direction of the drive of sponge rollers 31.

The present invention is by no means limited to the above described preferred embodiments; the rights applied for, within the scope of which many modifications can be envisaged, are defined by the following claims.

A non-limitatively intended modification relates for instance to the arrangement of carriers which extend parallel to the rollers at the bottom of the intermediate space between these rollers and which are then moved successively upward and substantially also along the surface of the rollers, just as the carriers of the above stated preferred embodiment.

What is claimed is:

1. A device for transporting articles along a longitudinal path of travel, said device comprising:

a spaced and parallel series of rotatable rollers extending along the path of travel, said rollers being fixed in position with respect to one another;

a drive assembly for rotating said rollers in the direction of the path of travel; and a carrier assembly positioned with respect to and spaced from said rollers and extending along the path of travel, the carrier assembly comprising a spaced series of carrier members constructed and arranged to engage a peripheral surface portion of said rollers, said carrier assembly being constructed and arranged to move said carrier members in the direction of the path of travel as the carrier members engage said rollers.

2. A device for transporting fragile articles along a longitudinal path of travel, said device comprising:

a spaced and parallel series of rotatable rollers extending along the path of travel for carrying the articles thereon, said rollers forming a series of intermediate article receiving spaces between successive rollers;

a drive assembly for rotating said rollers in the direction of the path of travel; and a carrier assembly positioned with respect to and spaced from said rollers and extending along the path of travel, the carrier assembly comprising a spaced series of carrier members constructed and arranged to engage a peripheral surface portion of said rollers, said carrier assembly being constructed and arranged to move said carrier members in the direction of the path of travel as the carrier members engage the peripheral surface portions of said rollers for urging the articles along the path of travel.

3. The device of claim 2, wherein said carrier members engage the articles in said intermediate article receiving spaces to urge the articles from out of the article receiving spaces over respective ones of the rollers and along the path of travel.

4. The device of claim 2, wherein said carrier members move into and out of respective ones of said intermediate article receiving spaces.

5. The device of claim 2, wherein said carrier members engage the articles from beneath and behind thereof as the articles are moved along the path of travel.

6. The device of claim 2, said carrier assembly comprising a conveyor belt moving in the direction of the path of travel, said carrier members comprising elongate brushes carried by the conveyor belt.

7. The device of claim 6, said brushes being pivotally affixed to the conveyor belt and being constructed and arranged to pivot when they strike the peripheral surface portion of said rollers.

8. The device of claim 6, wherein said brushes sweep the articles into successive ones of the article receiving spaces.

9. The device of claim 6, said brushes being formed of a resilient material.

10. The device of claim 2, said carrier assembly comprising a frame, said carrier members being carried by the frame, and a frame drive assembly for moving the frame toward and away from said rollers.

11. The device of claim 10, wherein said frame is constructed and arranged to move eccentrically toward and away from said rollers.

12. The device of claim 10, wherein said frame is constructed and arranged to move reciprocally toward and away from said rollers reciprocates.

13. The device of claim 10, said brushes being formed of a resilient material.

14. The device of claim 2, said rollers having a sponge textured exterior surface.

15. The device of claim 2, further comprising a spaced and parallel series of wringing rollers, one each for each said roller, and being constructed and arranged to engage the exterior surface of a respective one of said rollers.

16. A method of transporting fragile articles, to include fruit, along a longitudinal path of travel, said method comprising:

placing at least one of the articles onto a spaced and parallel series of rotatable rollers extending along the path of travel, said rollers forming a series of intermediate article receiving spaces between successive rollers;

rotating said rollers in the direction of the path of travel;

engaging at least a peripheral surface portion of said rollers with a spaced series of carrier members moving in the direction of the path of travel; and moving the carrier members against the at least one article to urge the at least one article in the direction of the path of travel.

17. The method of claim 16, including the step of urging the at least one article over respective ones of said rollers and in the direction of the path of travel with the carrier members.

18. The method of claim 16, including the step of urging the at least one article from a first article receiving space into a second article receiving space in the direction of the path of travel with the carrier members.

19. The method of claim 16, including the step of engaging the at least one article from beneath and behind thereof with the carrier members for moving the at least one article in the direction of the path of travel.

* * * * *